INVENTORS
WILLIAM E. BAKER
CHARLES L. URRERE

United States Patent Office 3,419,142
Patented Dec. 31, 1968

3,419,142
CHERRY STEMMING AND SORTING MACHINE
William E. Baker, El Cerrito, and Charles L. Urrere, Oakland, Calif., assignors to Atlas-Pacific Engineering Company, a corporation of California
Filed Mar. 29, 1967, Ser. No. 626,793
4 Claims. (Cl. 209—108)

ABSTRACT OF THE DISCLOSURE

Stemmed and unstemmed cherries are fed in bulk to a device which includes two apertured belts which cooperate to carry the cherries about spaced rotatable pulleys and drums. One of these belts and drums serves to remove some of the stemmed cherries from the mass while the other belt and drum cooperate selectively with auxiliary means to remove the stems from cherries passing about that drum.

Field of the invention

Of late there has been a demand from the trade for cherries with stems. A good portion of the cherries received from the orchard lack stems, therefore, there is a need for a machine to sort and separate cherries with stems from those without stems. Those machines provided in the past to make this separation have not produced sufficient cherries with stems and free of damage or the separation was not substantially complete. The machine of the present invention improves the output and accuracy of separation. Further, it can be set to remove the stems from all cherries or from only a portion of them and to separate the remainder.

Description of the prior art

Cooperating apertured belts have been used heretofore to separate cherries with stems from those without stems and such a device is shown in the Aguilar et al. Patent 2,714,411.

Summary of the invention

In general, it is the broad object of this invention to provide an improved cherry stemming and sorting machine.

Another object of the present invention is to provide a cherry stemming and sorting machine which can be adjusted to remove the stems from all cherries or sort out and separate a substantial portion of the cherries which have stems.

The invention includes other objects and features of advantage, some of which, together with the foregoing, will appear hereinafter when the present preferred embodiment of the invention is disclosed.

Description of the preferred embodiments

Figure 1:
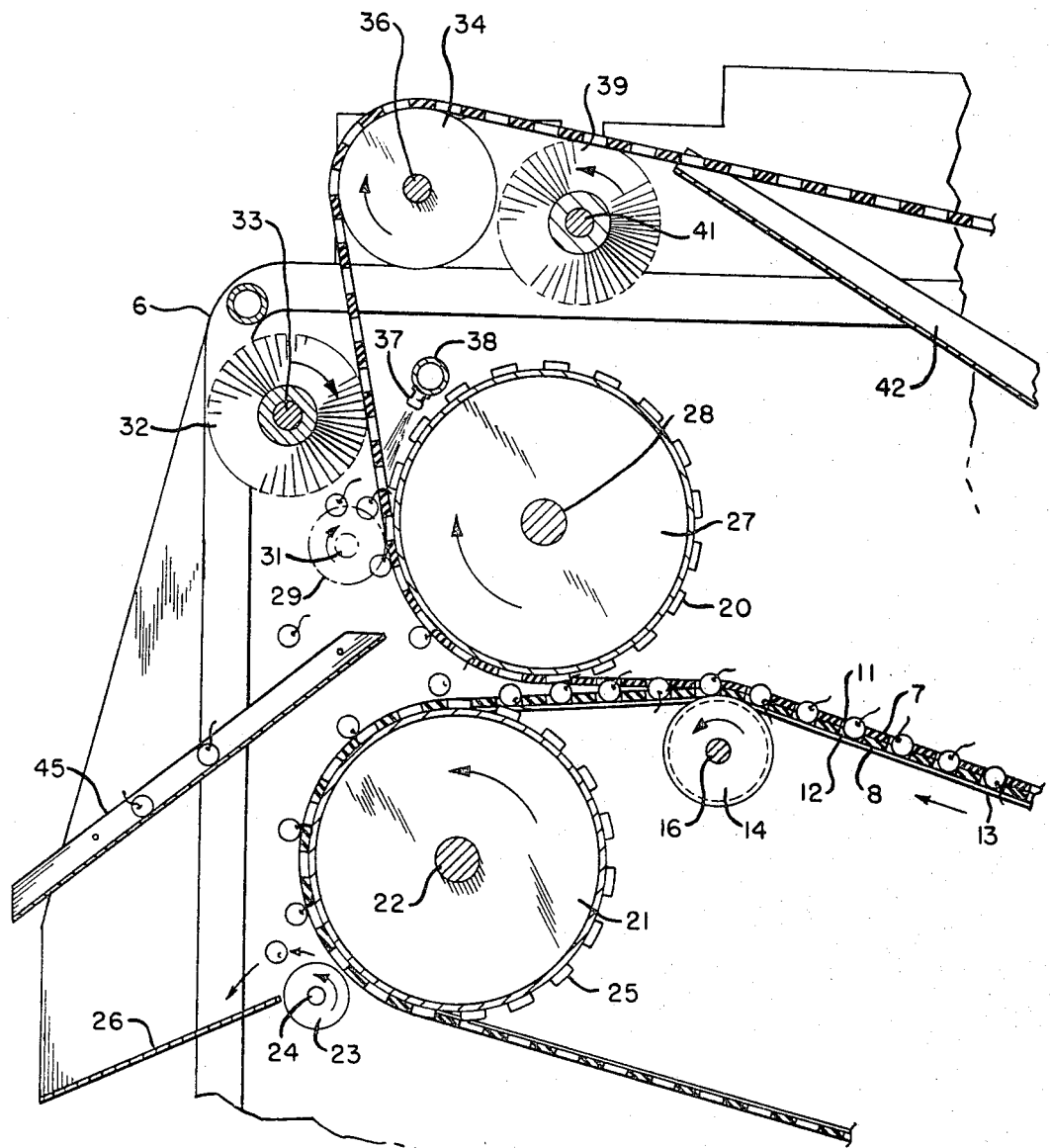
FIGURE 1 is an enlarged, fragmentary, semidiagrammatic sectional view taken transversely through a machine embodying the present invention.

The machine of the present invention includes opposite side plate 6 suitably joined together to provide a frame for the machine. These side plates carry the various bearings for pulleys, rollers, brushes and the like that extend between the side plates.

Two endless belt conveyors 7 and 8 are provided, conveyor 7 being superimposed above the conveyor 8. The belts extend forwardly from rearward pulleys, not shown and, for a substantially portion of their run, are contiguous. Each belt has circular perforations 11 and 21 therein each of which is adapted to receive a single cherry. The perforations are in register with each other along the adjacent, engaging runs of the belts. The thickness of each belt is equal to about half the diameter of a cherry so that the cherry will be about flush with the tip of belt 7.

The perforations 11 and 12 in the belts are in parallel rows extending longitudinally of said belts. Strips 13 are secured to the underside of the lower belt 8 and extend longitudinally of the belt and centrally across the perforations of each row leaving a relatively large space on the opposite sides of each strip at each perforation for the stems of cherries to project downwardly from the upper run of the lower belt when cherries having their stems directed downwardly are deposited in the registering pairs of perforations where the adjacent runs of the belts are together. Of course, the cherries that have their stems directed laterally or upwardly will have their stems projecting upwardly from the upper side of the lower run of belt 7 when such cherries drop into the pairs of registering openings. The strips 13 are flexible and may be of the same material as the belt.

Both belts pass over a roller 14 carried by shaft 16 and then the upper belt 7 passes over drum 27 carried on shaft 28 while the lower belt 8 passes over drum 21 mounted upon a shaft 22. That portion of the belts 7 and 8 ahead of the roller 14 provide a receiving area wherein cherries in bulk are deposited upon the contiguous belts 7 and 8.

In accordance with this invention, means are provided for separating these cherries which have stems attached from those which have the stems removed. The drum 27 is formed with outwardly projecting knobs or projections 20, so spaced, positioned and shaped as to enter the perforations 11 as the belt 7 moves over the drum. The corners of these projections are preferably rounded slightly so as to enter readily the perforations, but they do not fit the perforations so tightly as to sever the stems of the cherries that also enter the perforations, as will be presently explained.

Figure 2:
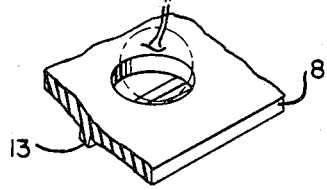
FIGURE 2 is a perspective view of the lower belt structure.

The drum 21 over which the lower belt 8 extends rotates on shaft 22 and has projections 25 that are the same as projections 20 except that they are centrally recessed (not shown) to receive the strips 13 on the under side of the belt 8 (FIGURE 2) so that the under side of the belt 8 is flat against the drum 21.

As the lower belt conveyor 8 is moved about the periphery of the drum 21, any cherries carried in the receptacle 12 in the belt without stems will fall onto the chute 26. Any cherries which have their stems engaged between the belt 8 and drum 21 will be separated from their stems by roller 23 carried on shaft 24. The output from the lower belt 8 and drum 21 will be substantially only cherries without stems.

Those cherries which are carried by the belts 7 and 8 with their stems projecting upwardly are engaged between the belt 7 and the drum 27 and are carried upwardly for further processing to produce only stemmed cherries or unstemmed cherries as desired. To achieve this, the belt 7 passes upwardly from drum 27 past a roll 29 carried upon a shaft 31 and thence past a brush 32 carried upon a shaft 33. Roll 29 is adjustable from a position close to the belt 7 to a position remote from the belt in which it does not engage cherries on the belt. Finally the belt 7 returns about an upper roller 34 mounted upon the shaft 36. Between the drum 27 and the upper roller 34, the belt 7 extends outwardly slightly to the vertical so that cherries will fall from the belt conveyor. The shafts 22, 24 and 41 are driven clockwise while the shafts 28, 31 and 33 are driven counter-clockwise as viewed in FIGURE 1 in the drawing.

Those cherries having their stems retained between the drum 27 and belt 7 will have their stems removed upon engagement with roll 29. Thus the output will be only cherries without stems and these are received on chute 45.

If it is desired to produce only cherries with stems attached from the upper belt 7 then roll 29 is moved away from the belt so that it is ineffective as a destemmer. In this case, cherries which pass beyond drum 27 with their stems retained in one of the apertures in belt 7 either fall free or are removed by the water jet applied from jet nozzles 37 from manifold 38 which extends across the width of the belt or are brushed off belt 7 by rotating brush 32 carried on shaft 33.

Any stems or leaves which pass over the roll 34 are brushed away by brush 39 mounted upon the shaft 41 and fall onto the waste chute back of drum 27 (not shown). Any cherries which manage to carry over onto the top run of belt 7 fall through the holes and are diverted by pan 42 to the cherry entry portion of the machine.

We claim:

1. In a machine for producing stemmed cherries and for separating stemmed cherries from unstemmed cherries having:
   (a) a pair of endless belts disposed one above the other;
   (b) a pair of drums at one of the corresponding ends of said belts over which they extend;
   (c) the upper belt and the lower belt of said pair respectively including a lower run and an upper run having a similar portion of each in parallel contacting relationship for a substantial distance and then extending divergently from each other to said drums;
   (d) means for actuating said belts for simultaneous movement of said portions at the same rate of speed to said drums;
   (e) perforations formed in said belts positioned for registration along said portions;
   (f) each perforation being adapted to receive a single cherry therein with its stem projecting above or below said lower and upper runs according to its position within a registering pair of perforations;
   (g) means below said lower run for supporting cherries in said perforations for movement with said belts to said drums;
   (h) The combined thickness of said runs being substantially equal to the diameter of a cherry whereby cherries in said registering openings will move to said drums for gripping of their projecting stems between said drums and said belts;
   (i) a lower roller extending across the lower pulley for engaging cherries carried about the lower drum with their stems held between the lower belt and the lower drum to separate such cherries from their stems; the improvement comprising:
      (1) A third pulley provided in advance of and above the upper drum and over which the upper belt passes after moving outwardly from the upper drum;
      (2) and an upper roller adjacent the upper drum and movable between a first position in which the roller is effective to engage cherries carried about the upper drum with their stems held between the upper belt and the upper drum to separate such cherries from their stems and a second position in which the upper roller is away from the upper drum whereby cherries with stems attached are carried beyond the upper drum.

2. A machine as in claim 1 wherein a water jet is played on the inside of the belt between the upper drum and the third pulley to loosen the stems of any cherries from the belt above the upper drum.

3. A machine as in claim 2 provided with a rotating brush to dislodge cherries with stems clinging to the belt.

4. A machine as in claim 3 having a chute to separate stemmed from unstemmed cherries.

References Cited

UNITED STATES PATENTS

| | | | |
|---|---|---|---|
| 2,668,619 | 2/1954 | Wormser | 209—108 |
| 2,714,411 | 8/1955 | Aguilar | 209—108 |
| 2,903,134 | 9/1959 | Ashlock | 209—108 |

M. HENSON WOOD, Jr., *Primary Examiner.*

R. A. SCHACHER, *Assistant Examiner.*

U.S. Cl. X.R.

146—238